United States Patent [19]

Gunning, III

[11] Patent Number: 4,952,025
[45] Date of Patent: Aug. 28, 1990

[54] RUGATE FILTER INCORPORATING PARALLEL AND SERIES ADDITION

[75] Inventor: William J. Gunning, III, Newbury Park, Calif.

[73] Assignee: The United States of America as represented by the Secretary of the Air Force, Washington, D.C.

[21] Appl. No.: 359,457

[22] Filed: May 31, 1989

[51] Int. Cl.$^5$ .................... G02B 5/00; G02B 13/00
[52] U.S. Cl. .................. 350/164; 350/162.24; 350/166; 350/316; 350/311
[58] Field of Search .................. 350/164–166, 350/167, 1.6, 311, 313, 316, 317; 356/382; 427/10, 53.1, 162, 167; 250/560

[56] References Cited

U.S. PATENT DOCUMENTS

| | | | |
|---|---|---|---|
| 3,846,152 | 5/1972 | Franz | 117/33.3 |
| 4,395,098 | 7/1983 | Mahlein | 350/166 |
| 4,583,822 | 4/1986 | Southwell | 350/164 |
| 4,602,287 | 7/1986 | Fockens | 358/197 |
| 4,673,270 | 6/1987 | Gordon | 350/96 |
| 4,707,611 | 11/1987 | Southwell | 356/382 |
| 4,735,488 | 4/1988 | Rancourt et al. | 350/166 |
| 4,819,239 | 4/1989 | Sharp et al. | 350/166 |
| 4,826,267 | 5/1989 | Hall et al. | 350/164 |
| 4,837,044 | 6/1989 | Murarka et al. | 427/10 |

OTHER PUBLICATIONS

Gradient–Index Antireflection Coatings W. H. Southwell, W. H. Southwell, Jul. 5, 1983 Rockwell International Science Center, Thousand Oaks, Calif. 91360.

*Primary Examiner*—Bruce Y. Arnold
*Assistant Examiner*—Thong Nguyen
*Attorney, Agent, or Firm*—Frederic L. Sinder; Donald J. Singer

[57] ABSTRACT

A rugate type thin film optical interference filter is disclosed. Rugate filters are gradient-index optical filters in which the index of refraction of the film varies sinusoidally with thickness. Gradient-index filters vary the index of refraction continuously with thickness, instead of discontinuously as in, for example, quarter-wave stacks of alternating discrete layers of high and low refractive index. Rugate filters are generally used as narrow bandwidth blocking, or rejection, filters in which the specific wavelength of light reflected, or blocked, is directly proportional to the period of a simple sine wave that describes the refractive index profile of the film. Multiple-line rejection filters, in which more than one wavelength, or line, is reflected, are made by superimposing individual sine waves in parallel. The present invention provides a more easily made rugate filter by reducing the maximum required peak-to-peak refractive index modulation within the film. This is accomplished by having the sine wave for rejecting the longest wavelength line extend through the refractive index profile for the entire film thickness and connecting the sine waves for rejecting shorter wavelength lines in series and superimposing them with the sine wave for rejecting the longest wavelength line. It also enables the fabrication of rugate filters having more individual reflectance bands of similar bandwidth than would otherwise be possible with a given pair of materials.

12 Claims, 10 Drawing Sheets

PRIOR ART

RUGATE FILTER INCORPORATING PARALLEL AND SERIES ADDITION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to thin film optical filters, and more specifically to a novel rugate type gradient-index thin film filter.

Rugate filters are thin film optical interference filters in which the index of refraction of the film varies sinusoidally with film thickness. Rugate filters differ from conventional thin film filters, such as quarter-wave stacks, in that the index of refraction varies continuously, i.e., gradient-index, with thickness, instead of discontinuously as in a quarter-wave stack of alternating discrete layers of high and low refractive index materials.

Thin film optical interference filters, depending upon their construction, may operate either as antireflection coatings or as highly reflective coatings. Appropriately constructed reflective coatings are commonly used as narrow bandwidth blocking filters that reflect preselected wavelengths of light, thereby preventing their unwanted transmission through the filter. The operation of a conventional quarter-wave stack to block selected wavelengths is well-known to those with skill in the art. The thickness of each layer in the stack is generally one-quarter the wavelength of the light to be blocked.

Unfortunately, quarter-wave stacks suffer from several disadvantages. Because quarter-wave stacks also partially reflect wavelengths for which the layer thicknesses are odd multiples of the quarter wavelengths, very complex arrangements are required to reduce the resulting sidebands. Sidebands are the wavelengths, on either side of a particular desired reflected or blocked wavelength, which are undesirably reflected to a lesser, but significant, degree. Quarter-wave stacks also suffer from excessive thickness, especially in multiple-line rejection filters in which multiple wavelengths, or lines, are desired to be blocked. Multiple-line rejection quarter-wave stacks are generally made by series addition in which a series of quarter-wave stacks, each made to block a particular wavelength, are stacked one on top of the other.

Quarter-wave stacks are also disadvantaged by a limited availability of suitable materials in obtaining a narrow bandwidth of the desired blocked wavelength(s) and in obtaining desired material properties, such as strength and hardness, of the film.

Gradient-index films solve many of the problems with discontinuous films. They are made by a variety of methods, typically variations of evaporating film materials in a vacuum and then condensing the vapor under very controlled conditions onto the cool surface of the material to be coated or other substrate. Because the refractive index is varied almost continuously, the restrictions of discrete layers are eliminated and films can be made that provide much greater flexibility in performance characteristics. Bandwidths can be made arbitrarily narrow and sidebands greatly reduced. Additionally, materials engineering techniques can be introduced in the vacuum deposition, or other appropriate, process to provide preselected film microstructures and material properties.

The rugate filter concept, which varies, in a gradient-index film, the refractive index sinusoidally, was first developed in the mid-1970's by Conrad Phillippi and others at Wright-Patterson Air Force Base, Ohio. Rugate filters provide a number of advantages, particularly in that they make the design of seemingly complex filters much more straightforward. Sinusoidal variation results in relatively simple equations for describing the reflection characteristics of rugate filters. Generally, a desired reflected wavelength is directly proportional to the period of a simple sine wave that describes the film refractive index profile. To achieve multiple-line rejection filters, the individual sine waves for each wavelength are merely linearly superimposed in parallel addition to achieve a multi-sinusoidal refractive index profile that varies with film thickness in a manner that looks complex, but which is easily determined. Further, multiple-line rugate filters, formed by parallel addition of sine waves, are much thinner than series added quarter-wave stacks.

Unfortunately, the peak-to-peak index modulation ($N_p$), the highest refractive index on a sine wave minus the lowest index, of a cumulative refractive index profile increases linearly with the number of lines. The total refractive index swing for a filter with N sine waves, each of which with identical $N_p$, is $N \times N_p$. The total available index modulation for a pair of materials A and B is $N_A - N_B$. Therefore, the number of lines for which a given filter can be designed to block under parallel additional alone is limited by the requirement that $(N \times N_p) < (N_A - N_B)$. The requirements for monitoring and control of the film deposition process become more severe as the refractive index modulation becomes a large fraction of the total possible variation with given materials. The limitations of present thin film technology in monitoring and control is a primary difficulty addressed in the rugate filter prior art.

Thus it is seen that there is a need for a method for making multiple-line rugate filters that reduces peak-to-peak index modulation while substantially preserving the advantages of parallel-added multiple-line rugate filters.

It is, therefore, a principal object of the present invention to provide a method for making a multiple-line rugate filter that has the smallest possible peak-to-peak index modulation.

It is a feature of the present invention that it produces the smallest possible peak-to-peak index modulation while preserving the thinnest possible film.

These and other objects, features and advantages of the present invention will become apparent as the description of certain representative embodiments proceeds.

SUMMARY OF THE INVENTION

The present invention provides a smallest possible peak-to-peak index modulation in a multiple-line rugate filter. The unique discovery of the present invention is that, because peak reflectivity is proportional to the number of cycles, shorter wavelength sine waves in the composite refractive index profile need not extend through the entire thickness of a film to achieve peak reflectivities substantially equal to that produced by the longest wavelength sine wave in the profile. The shorter wavelength sine waves can be connected together in series and superimposed with the longest wavelength sine wave in a rugate filter refractive index profile to produce a minimum peak-to-peak index modulation with no sacrifice in desired filter performance.

Accordingly, the present invention is directed to a method for making a multiple-line rugate filter on a substrate, comprising the step of depositing onto the substrate a film having a varying index of refraction profile which includes a plurality of superimposed subprofiles in which at least one subprofile comprises a plurality of individual sine waves connected in series.

The invention is further directed to a method for making a multiple-line rugate filter on a substrate, comprising the step of depositing onto the substrate a film having a varying index of refraction profile which includes a plurality of superimposed sine waves in which the sine wave having the longest wavelength is part of the profile throughout the entire thickness of the film and shorter wavelength sine waves are connected in series and superimposed with the longest wavelength sine wave. The method may further comprise the step of preselecting the number of cycles for each sine wave so that resulting peak reflectivities for preselected wavelengths of light impinging upon the film, each peak reflectivity corresponding to a separate sine wave, are substantially equal. The method may also include individually apodizing each sine wave at its ends.

The invention is also directed to a multiple-line rugate filter comprising a thin optical film having an index of refraction profile that varies multi-sinusoidally with thickness, the profile including a plurality of superimposed subprofiles in which at least one subprofile comprises a plurality of individual sine waves connected in series.

The invention is yet further directed to a multiple-line rugate filter comprising a thin optical film having an index of refraction profile that varies multi-sinusoidally with thickness wherein the profile includes a plurality of superimposed sine waves in which the sine wave having the longest wavelength is part of the profile throughout the entire thickness of the film and shorter wavelength sine waves are connected in series and superimposed with the longest wavelength sine wave. The rugate filter may include having the number of cycles for each sine wave preselected so that resulting peak reflectivities for preselected wavelengths of light impinging upon the film, each corresponding to a separate sine wave, are substantially equal. The rugate filter may also include having each sine wave individually apodized at its ends.

DESCRIPTION OF THE DRAWINGS

The present invention will be more clearly understood from a reading of the following detailed description in conjunction with the accompanying drawings wherein:

FIG. 3b is a graph of the reflectance spectrum of a single-line rugate filter having the refractive index profile of FIG. 3a;

FIG. 4b is a graph of a representatively general reflectance spectrum of a multiple-line rugate filter having the refractive index profile of FIG. 4a;

FIG. 5b is a graph of the calculated reflectance spectrum of the three-line rugate filter of FIG. 5a;

FIG. 6b is a graph of the calculated reflectance spectrum of the three-line rugate filter of FIG. 6a;

DETAILED DESCRIPTION

Figure 1A:
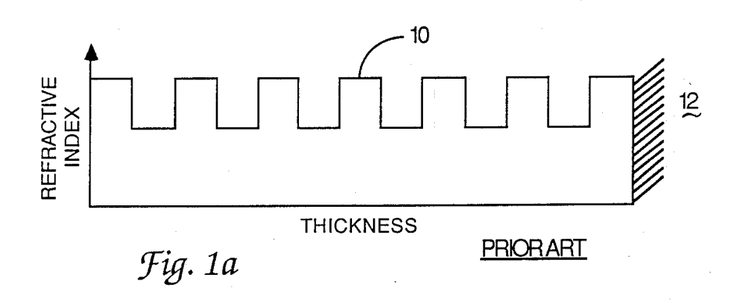
FIG. 1a is a graph of the refractive index profile of a conventional quarter-wave stack.

Referring now to FIG. 1a of the drawings, there is shown a graph of the refractive index profile 10 of a conventional quarter-wave stack on a substrate 12 showing the discontinuous variation of refractive index with thickness of the optical film. Such stacks, also called dielectric stacks, are generally made of discrete layers of alternating high and low refractive index. The optical interference between incident light and the partial reflection of light at the interfaces between layers cumulatively results in a particular wavelength being preferentially reflected from the film filter.

Figure 1B:
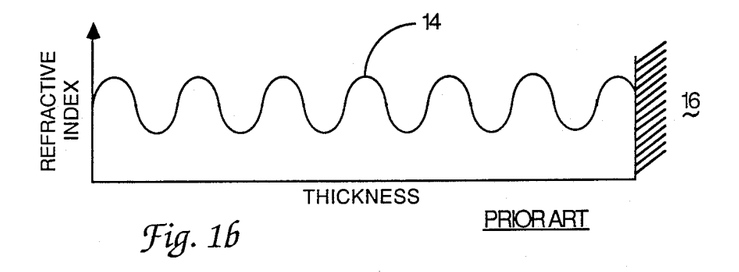
FIG. 1b is a graph of the refractive index profile of an example gradient-index film.

FIG. 1b shows a graph of the refractive index profile 14 of a gradient-index film on a substrate 16. Despite the lack of clearly defined interfaces, light traveling through the filter partially reflects as the index of refraction continuously changes, producing interference effects similar to a discontinuously varying refractive index stack.

Figure 2:
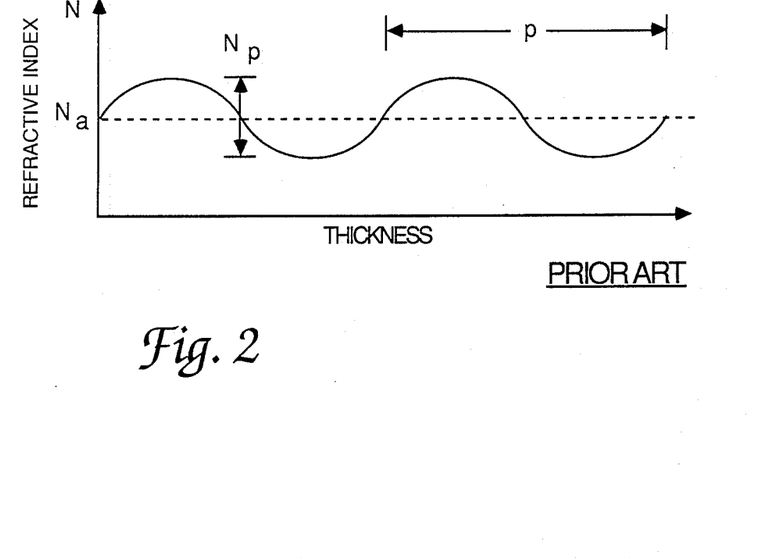
FIG. 2 is a graph of the refractive index profile of a single-line rugate filter showing various parameters used in calculating the optical characteristics of such filters.
Figure 3A:
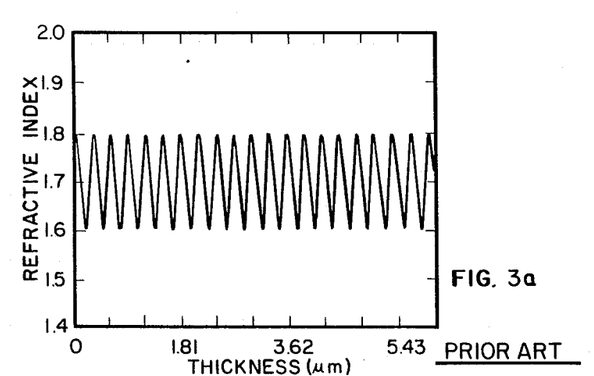
FIG. 3a is a graph of the refractive index profile of another single-line rugate filter.
Figure 3B:
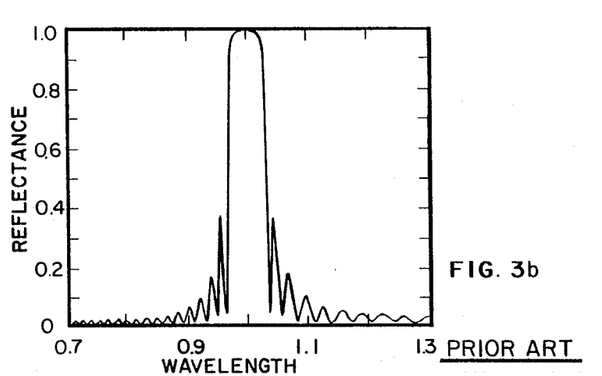

FIG. 2 is a graph of refractive index versus thickness for a simple single-line rugate filter showing some of the sine wave parameters used for determining the reflection characteristics of the single-line filter. The refractive index $N(x)$ is described by the equation $$N(x) = N_a + \tfrac{1}{2}N_p \cdot \mathrm{SIN}(2\pi x/p)$$

where x is the thickness of the film, $N_a$ the average refractive index of one cycle, $N_p$ the peak-to-peak index variation (the highest refractive index on a sine wave minus the lowest index) and p the period of the sine wave. For refractive index profiles described by the above equation, the wavelength at which maximum reflection occurs, $\lambda_o$, is described by the equation $$\lambda_o = 2N_a p$$

The bandwidth of the thus created high reflectance zone surrounding $\lambda_o$ is described by the equation $$\Delta\lambda/\lambda_o = N_p/2N_a$$

The reflective optical density, OD, used to describe the reflectivity of the high reflectance zone, is described by the equation $$\text{Reflective OD} = 1.36(\Delta\lambda/\lambda_o)N_c\text{-log}_{10}(4N_o/N_s)$$

where $N_c$ is the number of sine wave cycles in the film, $N_o$ the refractive index of the incident medium (usually air) and $N_s$ the refractive index of the substrate.

Figure 4A:
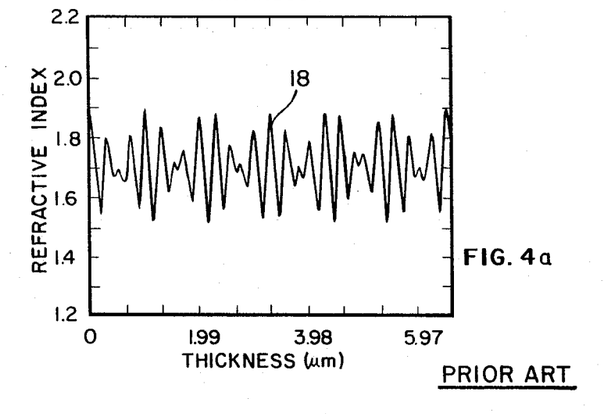
FIG. 4a is a graph of the refractive index profile of an example multiple-line rugate filter.
Figure 4B:
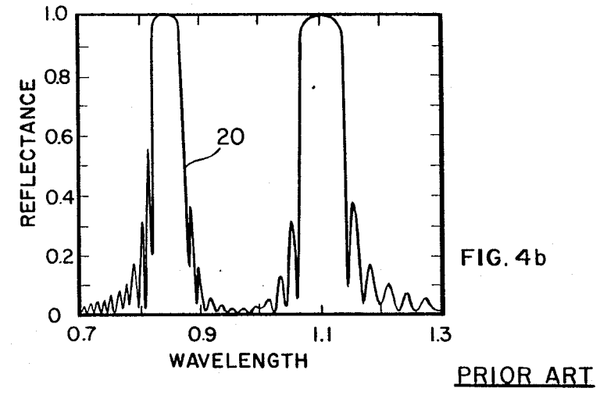

Examples of the resulting reflectance spectrum for an example single-line rugate filter and an example multiple-line rugate filter are shown, respectively, in FIGS. 3a–3b and FIGS. 4a–4b. Inspection of FIGS. 4a and 4b shows that simple parallel addition of two sine waves produces a seemingly complex refractive index profile 18 that results in the representatively general twin peak reflectance spectrum 20 shown in FIG. 4b.

Figure 5A:
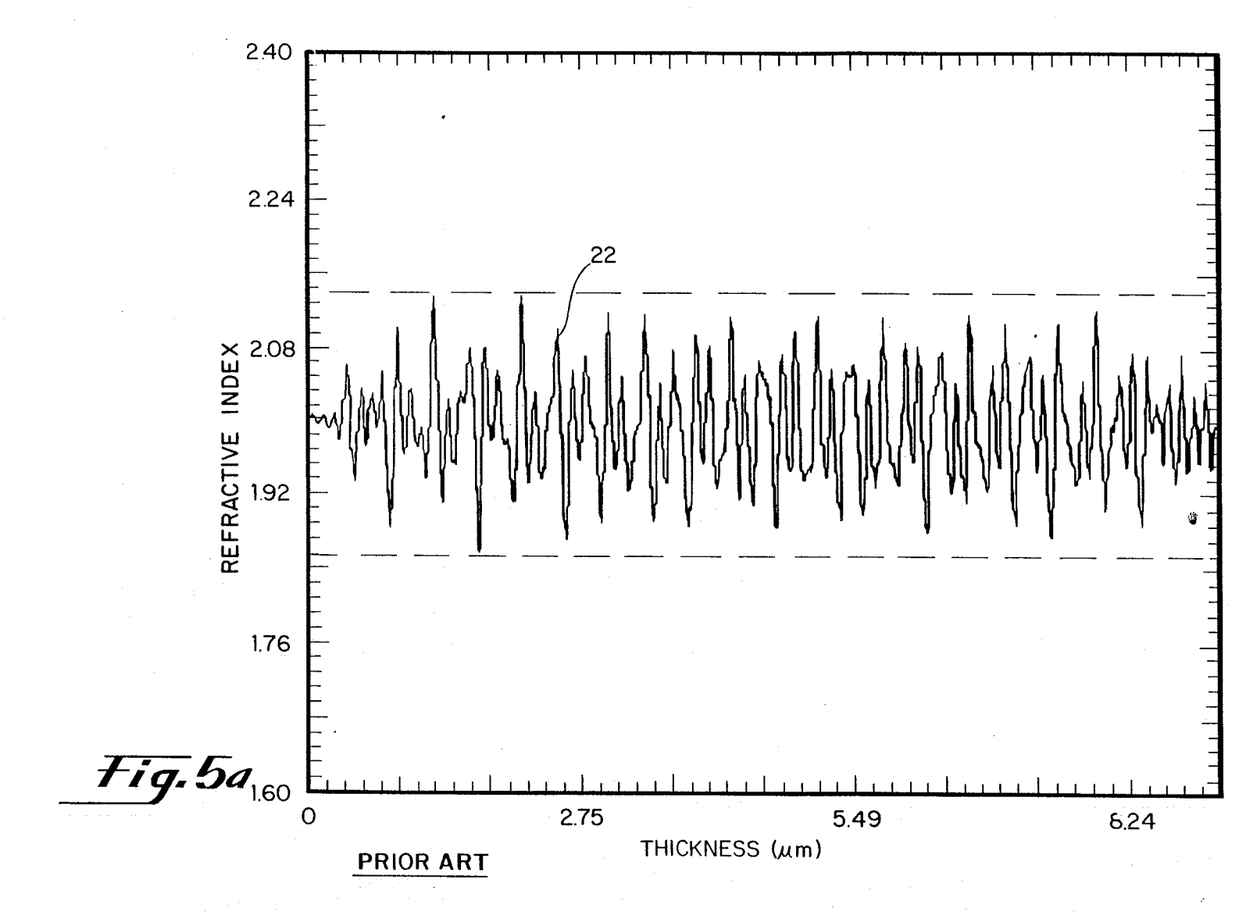
FIG. 5a is a graph of the refractive index profile of a three-line rugate filter constructed with all the individual sine waves added in parallel according to the teachings of the prior art.

FIG. 5a is a graph of the refractive index profile 22 of a three-line rugate filter constructed with the individual sine waves added in parallel according to the teachings of the prior art. Profile 22 is apodized at its ends, corresponding to the opposite surfaces of the film, by individually applying a preselected function to each sine wave to shape them to gradually reduce their index modulation, and the resulting overall profile index modulation, to zero at the ends. Apodization serves to increase broadband filter transmission by reducing the amplitude of reflective sidebands that would otherwise occur adjacent to the main reflection peak. Apodization also assists in starting and terminating the individual series rugate filter sine wave profiles within the filter. This avoids abrupt changes in the refractive index profile which would be difficult to monitor and control, and helps to reduce sidebands originating from anomalous reflection within the rugate structure.

Figure 5B:
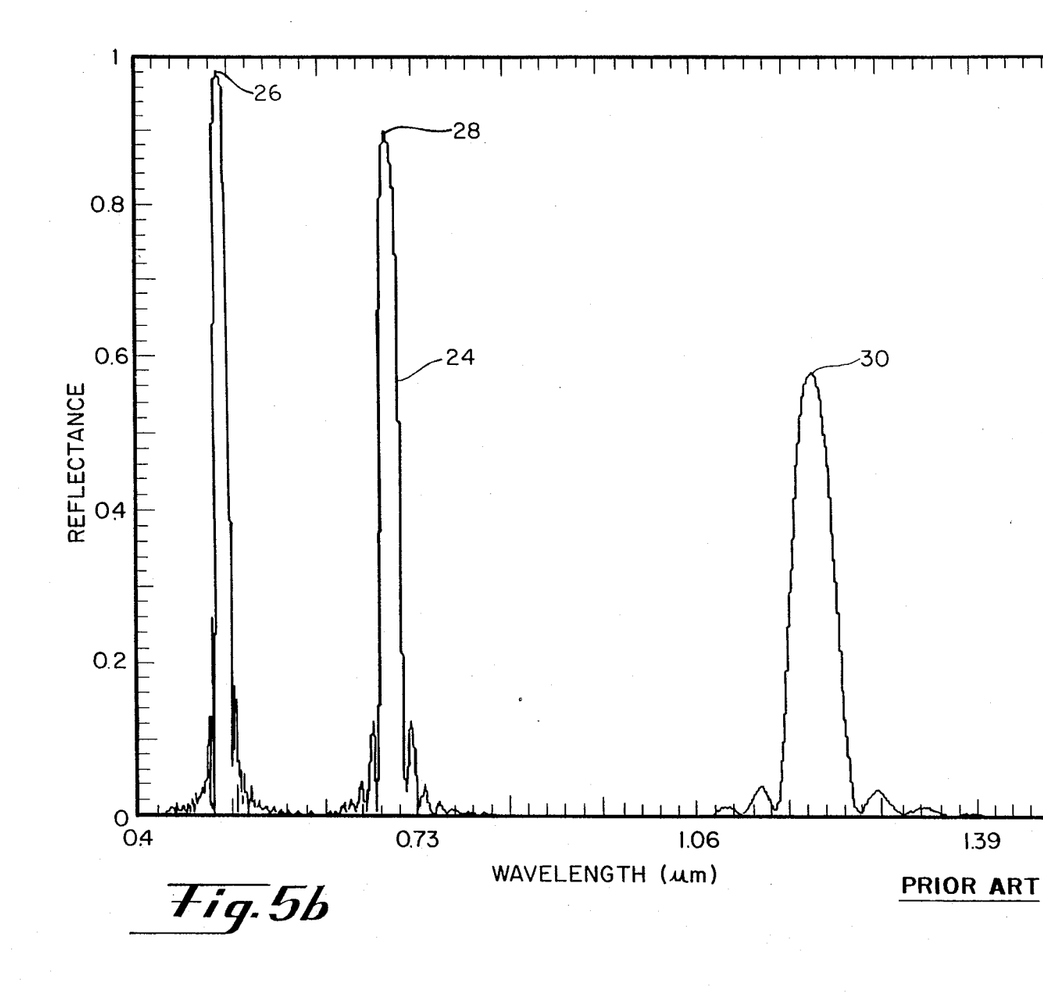

The lines desired to be blocked have wavelengths of 0.5, 0.7 and 1.2 microns. FIG. 5b is a graph of the calculated reflectance spectrum 24 of the three-line filter of FIG. 5a showing the peaks 26, 28 and 30 at 0.5, 0.7 and 1.2 microns. Because the reflective OD is directly proportional to the number of cycles, and because shorter wavelength sine waves have, necessarily, a higher number of cycles for the same film thickness, resulting peak reflectivities 26, 28 and 30 for such shorter wavelength sine waves are higher than for the longer wavelength sine waves included in the overall refractive index profile. The sine wave corresponding to the longest wavelength line, 1.2 microns, has 30.5 cycles in profile 24. The number of cycles for the sine waves corresponding to the wavelength lines of 0.7 and 0.5 microns, respectively, are 52 and 91.5 cycles.

Figure 6A:
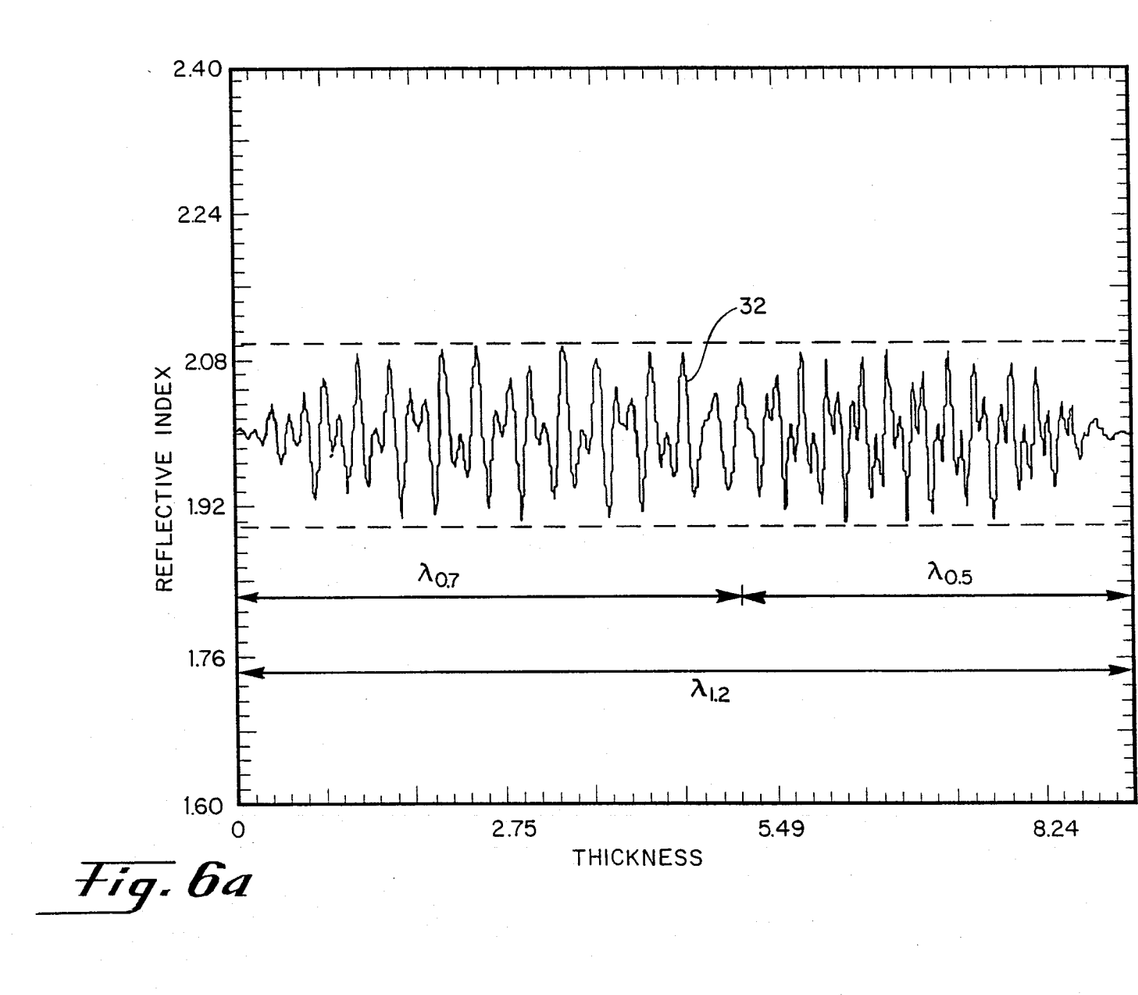
FIG. 6a is a graph of the refractive index profile of a three-line rugate filter constructed with the individual sine waves added both in parallel and in series according to the teachings of the present invention.
Figure 6B:
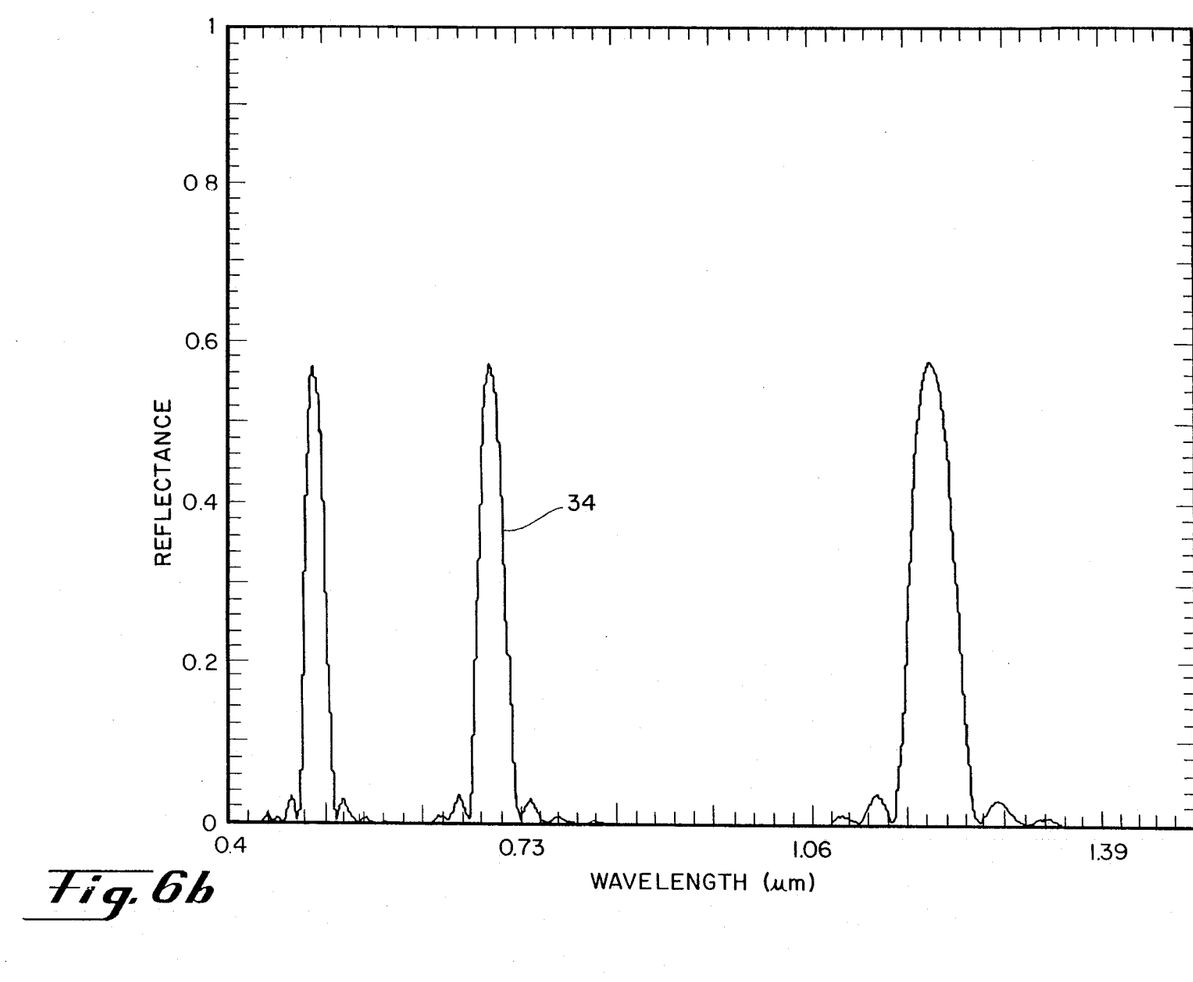

FIG. 6a is a graph of the refractive index profile 32 of a three-line rugate filter constructed according to the teachings of the present invention with the shorter individual sine waves added in series with each other, and in parallel with the longest wavelength sine wave. The film thickness over which each sine wave extends is indicated by $\lambda_{1.2}$, $\lambda_{0.7}$ and $\lambda_{0.5}$. The sine waves of profile 32 are individually apodized. Refractive index profile 32 is made to block the same wavelengths as profile 22 of FIG. 5a, being 0.5, 0.7 and 1.2 microns. However, in profile 22 all the sine waves have 30.5 cycles so that the peak reflectivities for the rejected lines are substantially equal, as shown in the calculated reflectance spectrum 34 of FIG. 6b. Comparison of profile 32 to profile 22 shows that the peak-to-peak refractive index of profile 32 is only two-thirds that of profile 22, substantially reducing the monitoring and controlling difficulties involved during film deposition and enabling the design of filters which can block more lines than would otherwise be possible with a given pair of materials.

Figure 7:
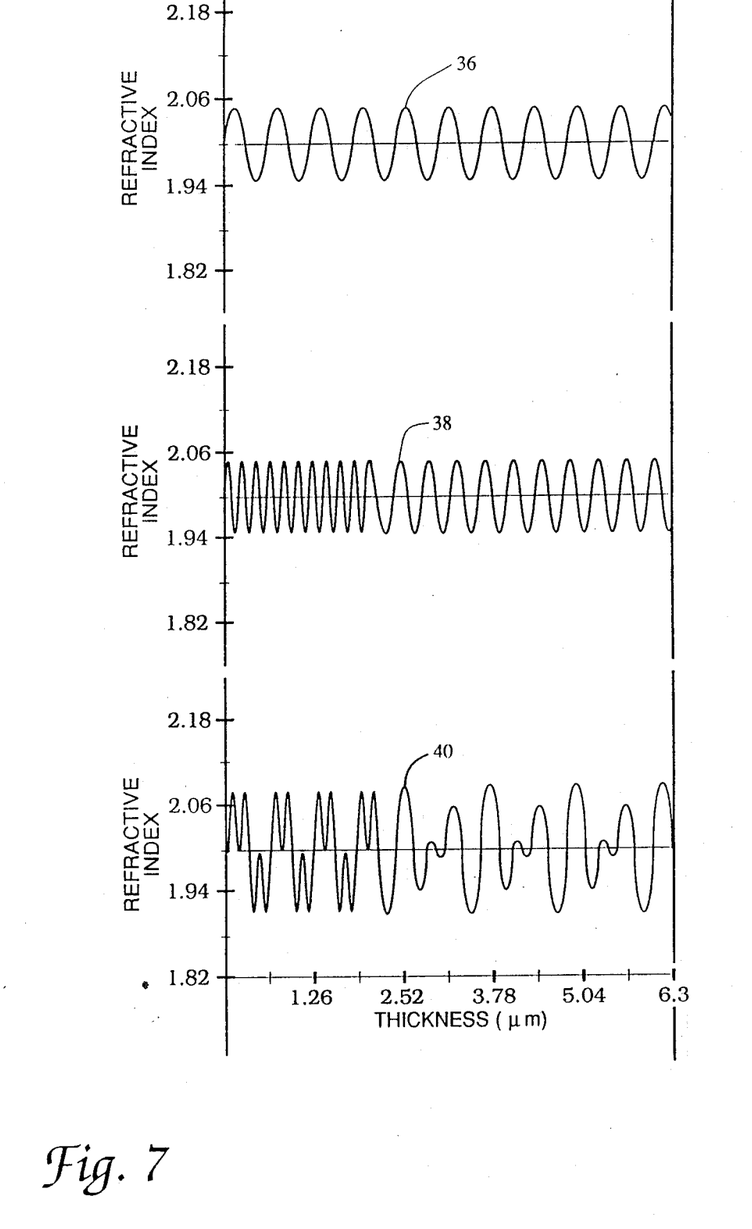
FIG. 7 is a three x-axis graph of the component subprofile and cumulative refractive index profiles of a three-line rugate filter constructed according to the teachings of the present invention.

FIG. 7 is a three x-axis graph of component refractive index subprofiles 36 and 38, and resulting cumulative refractive index profile 40 of a three-line rugate filter constructed according to the teachings of the present invention. Subprofile 36 comprises a single sine wave and subprofile 38 comprises two individual sine waves added in series. Resulting profile 40 shows the resulting minimized peak-to-peak index modulation. For simplicity and clarity, not all the total number of cycles required are shown.

Figure 8:
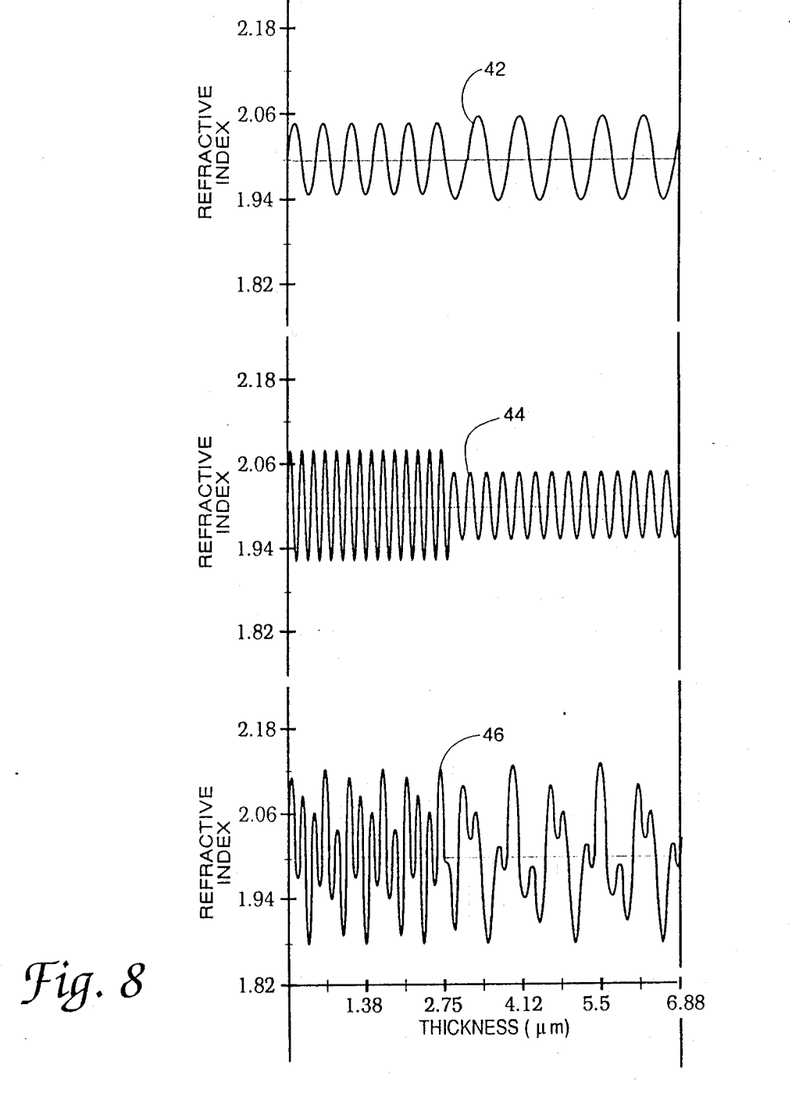
FIG. 8 is a three x-axis graph of the component subprofile and cumulative refractive index profiles of a four-line rugate filter constructed according to the teachings of the present invention; and, FIG. 9 is a three x-axis graph of the component subprofile and cumulative refractive index profile of another three-line rugate filter constructed according to the teachings of the present invention.

FIG. 8 is a three x-axis graph of component refractive index subprofiles 42 and 44 and resulting cumulative refractive index profile 46 of a four-line rugate filter constructed according to the teachings of the present invention. Subprofiles 42 and 44 each comprise two individual sine waves of different wavelengths and amplitude added in series. The series added individual sine waves of subprofiles 42 and 44 are matched so that the peak-to-peak refractive index variation of resulting parallel added profile 46 is minimized. In this example, the two highest amplitude sine waves have been straightforwardly matched inversely with the two lowest amplitude sine waves. Other matchings might be made to accomplish other desired objectives. For example, fabrication difficulties may dictate matching individual sine waves for combined parallel and series addition to achieve a smoother overall profile. Also, phase differences may be introduced to change the overall shape of the cumulative profile without, generally, changing the maximum peak-to-peak refractive index variation.

Figure 9:
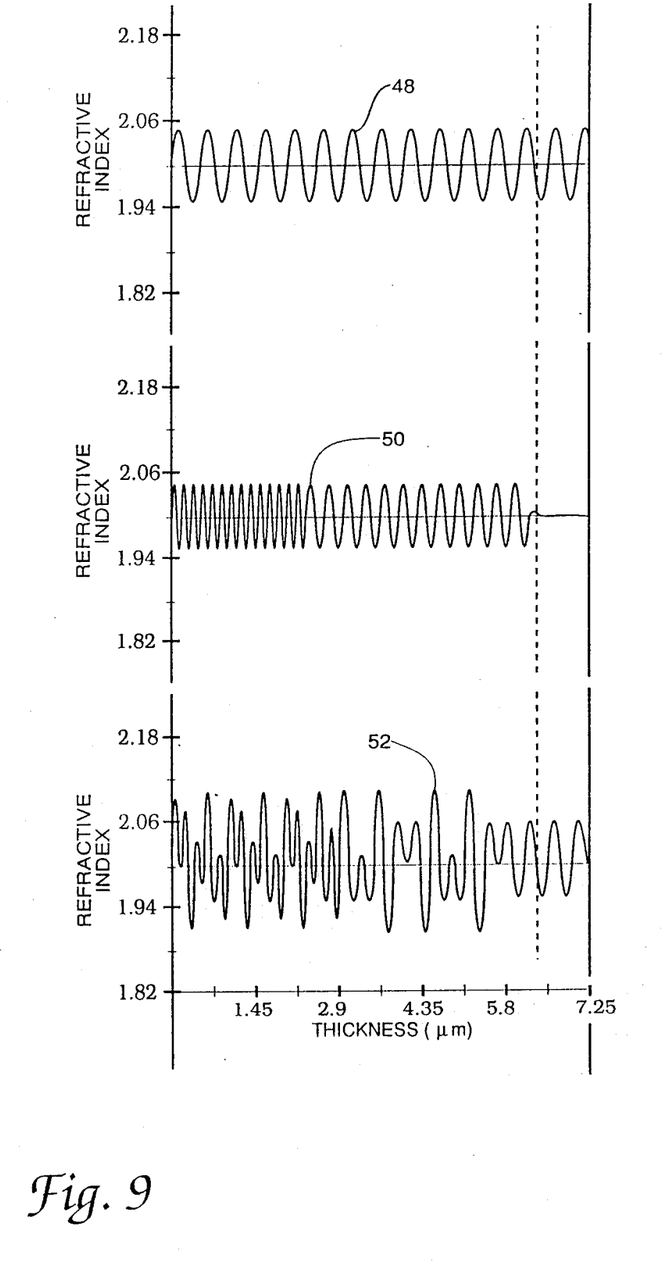

FIG. 9 is a three x-axis graph of component subprofiles 48 and 50 and cumulative refractive index profile 52 of another three-line rugate filter constructed according to the teachings of the present invention. Subprofile 48 comprises a single sine wave and subprofile 50 comprises two sine waves added in series for a total length within subprofile 50 shorter than that of subprofile 48. Refractive index profiles similar to profile 52, shown with fewer than the actual number of cycles for clarity, may result when the desired peak reflectivity for the longest wavelength sine wave requires more cycles than are necessary for the shorter wavelength sine waves. Similarly, there is no requirement that the resulting peak reflectivities for the individual sine waves be identical, only that the resulting peak reflectivities be sufficient to accomplish a desired result.

Although the teachings of the present invention primarily contemplate superimposing only two sine waves in parallel at one time, achieving particular desired results in some films may require some overlapping of series connected shorter wavelength sine waves so that three or more sine waves may be added in parallel for short distances through a film thickness. The phrase "in series" as used in the claims includes such overlapping.

The disclosed method for making a rugate filter successfully demonstrates using both parallel and series addition of refractive index profile shapes to make an optimal thin film optical filter. Though the disclosed use is specialized, its teachings will find application in other areas of thin film design where thinner films are needed and will contribute to the solution of other thin film problems.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A method for making a multiple-line rugate filter on a substrate, comprising the step of depositing onto the substrate a film having a varying index of refraction profile which includes a plurality of superimposed subprofiles wherein at least one subprofile comprises a plurality of individual sine waves connected in series.

2. A method for making a multiple-line rugate filter on a substrate, comprising the step of depositing onto the substrate a film having a varying index of refraction profile which includes a plurality of superimposed sine waves in which the sine wave having the longest wavelength is part of the profile throughout the entire thickness of the film and shorter wavelength sine waves are connected in series and superimposed with the longest wavelength sine wave.

3. The method for making a multiple-line rugate filter according to claim 2, further comprising the step of preselecting the number of cycles for each sine wave so that resulting peak reflectivities for preselected wavelengths of light impinging upon the film, each peak reflectivity corresponding to a separate sine wave, are substantially equal.

4. The method for making a multiple-line rugate filter according to claim 3, further comprising the step of apodizing each individual sine wave at its ends.

5. A method for depositing a thin film optical filter onto a substrate, comprising the step of controlling the deposit to continuously vary the index of refraction of the deposit so that the resulting index of refraction profile varies multi-sinusoidally with thickness by including a plurality of superimposed subprofiles wherein at least one subprofile comprises a plurality of individual sine waves connected in series.

6. A method for depositing a thin film optical filter onto a substrate, comprising the step of controlling the deposit to continuously vary the index of refraction of the deposit so that the resulting index of refraction profile varies multi-sinusoidally with thickness by including a plurality of superimposed sine waves wherein the sine wave having the longest wavelength is part of the profile throughout the entire thickness of the film and shorter wavelength sine waves are connected in series and superimposed with the longest wavelength sine wave.

7. The method for depositing a thin film optical filter onto a substrate according to claim 6, further comprising the step of preselecting the number of cycles for each sine wave so that resulting peak reflectivities for preselected wavelengths of light impinging upon the film, each peak reflectivity corresponding to a separate sine wave, are substantially equal.

8. The method for depositing a thin film optical filter onto a substrate according to claim 6, further comprising the step of apodizing each individual sine wave at its ends.

9. A multiple-line rugate filter, comprising a thin optical film having an index of refraction profile that varies multi-sinusoidally with thickness, the profile including a plurality of superimposed subprofiles wherein at least one subprofile comprises a plurality of individual sine waves connected in series.

10. A multiple-line rugate filter, comprising a thin optical film having an index of refraction profile that varies multi-sinusoidally with thickness wherein the profile includes a plurality of superimposed sine waves in which the sine wave having the longest wavelength is part of the profile throughout the entire thickness of the film and shorter wavelength sine waves are connected in series and superimposed with the longest wavelength sine wave.

11. The rugate filter according to claim 10, wherein the number of cycles for each sine wave is preselected so that resulting peak reflectivities for preselected wavelengths of light impinging upon the film, each corresponding to a separate sine wave, are substantially equal.

12. The rugate filter according to claim 10, wherein each sine wave is individually apodized at its ends.

* * * * *